US010324367B2

(12) United States Patent
Liu

(10) Patent No.: US 10,324,367 B2
(45) Date of Patent: *Jun. 18, 2019

(54) AERIAL PANORAMIC OBLIQUE PHOTOGRAPHY APPARATUS

(71) Applicant: AS VISION LIMITED, Hong Kong (HK)

(72) Inventor: Man Kit Liu, Hong Kong (HK)

(73) Assignee: AS VISION LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,865

(22) Filed: Oct. 31, 2018

(65) Prior Publication Data

US 2019/0072844 A1 Mar. 7, 2019

Related U.S. Application Data

(63) Continuation of application No. 15/458,048, filed on Mar. 14, 2017, now Pat. No. 10,151,970.

(30) Foreign Application Priority Data

Apr. 11, 2016 (HK) .................................... 16104117
Feb. 1, 2017 (CN) .......................... 2017 1 0062224

(51) Int. Cl.
*G03B 37/04* (2006.01)
*G03B 17/02* (2006.01)
*G03B 15/00* (2006.01)

(52) U.S. Cl.
CPC ........... *G03B 37/04* (2013.01); *G03B 15/006* (2013.01); *G03B 17/02* (2013.01)

(58) Field of Classification Search
CPC ..................................................... G03B 37/04
See application file for complete search history.

(56) References Cited

U.S. PATENT DOCUMENTS

| 10,151,970 B2* | 12/2018 | Liu ................. G03B 37/04 |
| 2004/0246333 A1* | 12/2004 | Steuart, III ............ G03B 35/08 348/36 |
| 2014/0168443 A1* | 6/2014 | Aguilar .................. H04N 7/183 348/158 |

(Continued)

FOREIGN PATENT DOCUMENTS

CN 203231750 U 10/2013

*Primary Examiner* — Clayton E. LaBalle
*Assistant Examiner* — Dennis Hancock

(57) ABSTRACT

An aerial panoramic oblique photography apparatus includes a pod body provided with at least two nadir cameras and a plurality of oblique cameras. The at least two nadir cameras are arranged in a transverse direction, and the shooting regions of adjacent nadir cameras of the at least two nadir cameras are partially overlapping. Since the aerial panoramic oblique photography apparatus is provided with at least two transversely arranged nadir cameras, a plurality of stripes of aerial images is obtained for each aerial oblique photo-shooting operation. This can increase photo-shooting efficiency, reduce the number of flight, and lower photo-shooting cost. The combination of at least two nadir cameras and a plurality of oblique cameras can capture texture of the sides of urban buildings from multiple angles. Three-dimensional real scenery model of a city can be established more efficiently and completely.

14 Claims, 5 Drawing Sheets

(56) References Cited

U.S. PATENT DOCUMENTS

| | | | |
|---|---|---|---|
| 2015/0367958 A1* | 12/2015 | Lapstun | B64D 47/08 |
| | | | 348/144 |
| 2015/0373267 A1 | 12/2015 | Lapstun et al. | |
| 2015/0373279 A1* | 12/2015 | Osborne | G02B 13/0075 |
| | | | 348/36 |
| 2017/0363949 A1* | 12/2017 | Valente | H04N 13/344 |
| 2018/0063429 A1* | 3/2018 | Enriquez | H04N 5/23238 |

* cited by examiner

AERIAL PANORAMIC OBLIQUE PHOTOGRAPHY APPARATUS

CROSS-REFERENCE TO RELATED APPLICATIONS

This application is a Continuation Application of U.S. patent application Ser. No. 15/458,048 filed on Mar. 14, 2017 which claims the benefit of Hong Kong Patent Application No. 16104117.2, filed Apr. 11, 2016 and Chinese patent application No. 201710062224.9 filed on Feb. 1, 2017, the entire content of which is hereby incorporated by reference.

FIELD OF THE TECHNOLOGY

The present application relates to the field of aerial photography technology, and more particularly to an aerial panoramic oblique photography apparatus.

BACKGROUND

Aerial panoramic oblique photography apparatus belongs to the technical field of aerial photogrammetry and aerial oblique photogrammetry. Aerial photogrammetry relates to aerial photo-shooting and the use of photogrammetry technology to produce a variety of surveying and mapping products, such as digital terrain models, orthophoto maps and vector maps. Aerial oblique photogrammetry is to obtain texture of the sides of an object on the ground by taking photos at an oblique angle, and then establish a real urban three-dimensional model by the photogrammetry technology.

Aerial oblique photography is a breakthrough of the traditional aerial photogrammetry. It takes photos of natural objects and man-made buildings on the ground by a group of cameras arranged at different angles. The existing aerial oblique photography apparatus is generally in the form of a group of five cameras, including a nadir camera and four oblique cameras. In consideration of the number of cameras, and the size and weight of the apparatus, the oblique cameras will generally be commercial medium format cameras or full frame cameras.

Oblique cameras of the five-camera photography apparatus have limited coverage areas during operation. It is required to increase the overlapping and sidelap in order to achieve a complete image-capturing. Overlapping depends on the speed of the aerial vehicle and the operating speed of the cameras. A five-camera combination generally requires nadir camera to have 80% overlapping in order to meet urban 3D model requirements. Sidelapping is the overlapping between each flight line. A five-camera combination generally requires nadir cameras to have an 80% overlapping in order to meet the urban shooting requirements. Since the area array of the medium or full frame camera is relatively small, and high-resolution images require a low-altitude flight, it will result in low flight efficiency for a large overlapping photo-taking task. The cost of flight will therefore be multiplied, and the number of images will be increased and repeated.

SUMMARY

An object of the aerial panoramic oblique photography apparatus of the present application is to provide an aerial panoramic oblique photography apparatus which can improve operation efficiency and reduce costs by means of a novel arrangement of cameras.

According to one aspect, there is provided an aerial panoramic oblique photography apparatus including a pod body provided with at least two nadir cameras and a plurality of oblique cameras, wherein the at least two nadir cameras are arranged in a transverse direction, and shooting regions of adjacent nadir cameras of the at least two nadir cameras are partially overlapping.

In one embodiment, an angle of a lens axis of each nadir camera from a vertical direction is less than 10 degrees, and 30% to 60% of the shooting regions of the adjacent nadir cameras of the at least two nadir cameras are overlapping.

In one embodiment, the lens axes of the at least two nadir cameras are lying on a same plane, and the lens axes of the adjacent nadir cameras are inclined in converging directions towards each other or inclined in diverging directions away from each other.

In one embodiment, a lens of the nadir camera is a fixed focus lens, and focal length of the fixed focus lens of the nadir camera is 20 to 100 mm.

In one embodiment, the plurality of oblique cameras is disposed around the nadir cameras, and an angle of a lens axis of each oblique camera from a vertical direction is 30 to 60 degrees.

In one embodiment, a lens of the oblique camera is a fixed focus lens, and focal length of the fixed focus lens of the oblique camera is 35 to 150 mm.

In one embodiment, the shooting regions of the nadir cameras and shooting regions of the oblique cameras transversely adjacent to the nadir cameras are partially overlapping.

In one embodiment, the pod body is a one-piece structure or a separable structure.

In one embodiment, the pod body is a separable structure, and the pod body includes a left pod unit and a right pod unit, the left pod unit and the right pod unit each having one of the nadir cameras and a plurality of the oblique cameras.

In one embodiment, the number of the oblique cameras is eight or more, and the plurality of oblique cameras is provided on two levels, namely an upper level and a lower level.

The aerial panoramic oblique photography apparatus of the present application has the following beneficial effects. Since the aerial panoramic oblique photography apparatus is provided with at least two transversely arranged nadir cameras, a plurality of stripes of aerial images is obtained for each aerial oblique photo-shooting operation. This can increase photo-shooting efficiency, reduce the number of flight lines, and lower the photo-shooting cost. The combination of at least two nadir cameras and a plurality of oblique cameras, texture of the sides of urban buildings can be obtained from multiple angles. Three-dimensional real scenery model of a city can be established more efficiently and completely.

BRIEF DESCRIPTION OF THE DRAWINGS

Specific embodiments will now be described by way of example with reference to the accompanying drawings wherein:

FIG. 1b is a bottom view of the aerial panoramic oblique photography apparatus shown in FIG. 1a.

FIG. 1c is a left side view of the aerial panoramic oblique photography apparatus shown in FIG. 1a.

FIG. 4 is an illustrative diagram of the synchronized shooting coverage areas of the aerial panoramic oblique photography apparatus shown in FIG. 1a.

FIG. 5 is an illustrative diagram of synchronized shooting by 12 cameras of the aerial panoramic oblique photography apparatus shown in FIG. 1a.

FIG. 6b is an illustrative diagram of an image formed by synchronized shooting of a nadir camera and an oblique camera adjacent to the nadir camera of the aerial panoramic oblique photography apparatus shown in FIG. 1a.

DETAILED DESCRIPTION

Figure 1A:
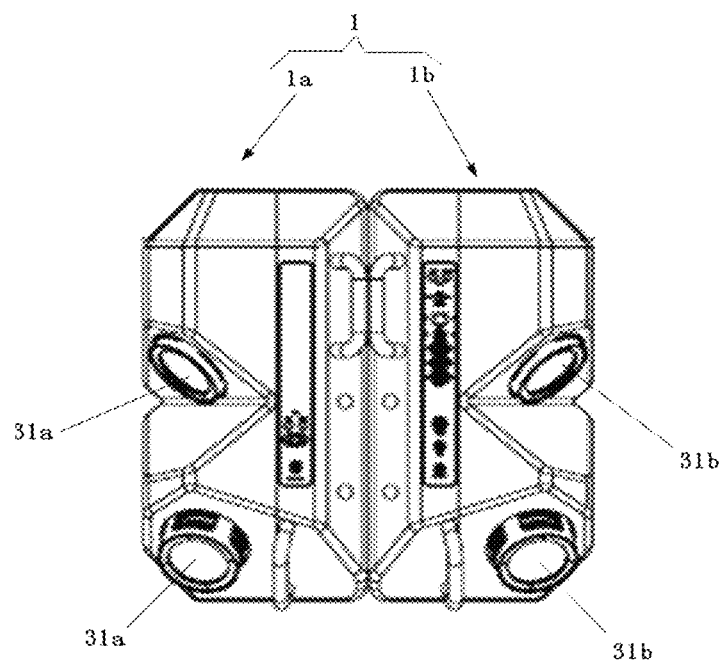
FIG. 1a is a front view of an embodiment of the aerial panoramic oblique photography apparatus of the present application.

To have a clear understanding of the technical features, objects and effects of the aerial panoramic oblique photography apparatus of the present application, specific embodiments will now be described in detail with reference to the accompanying drawings.

Embodiments of the aerial panoramic oblique photography apparatus of the present application are described below in detail. These embodiments are shown in the accompanying drawings. Like reference numerals representing like parts with like functions are used throughout the drawings.

It should be appreciated that in the description of the aerial panoramic oblique photography apparatus of the present application, the terms "front", "rear", "top", "bottom", "upper end", "lower end", "upper portion", "lower portion", etc. refer to the orientation or position of a structure as it is oriented and positioned in the drawings. Those terms are used to simplify the description and do not indicate or imply that the structure must have a specific orientation or operate in a specific position. Those terms should not be considered as limiting.

Figure 1B:
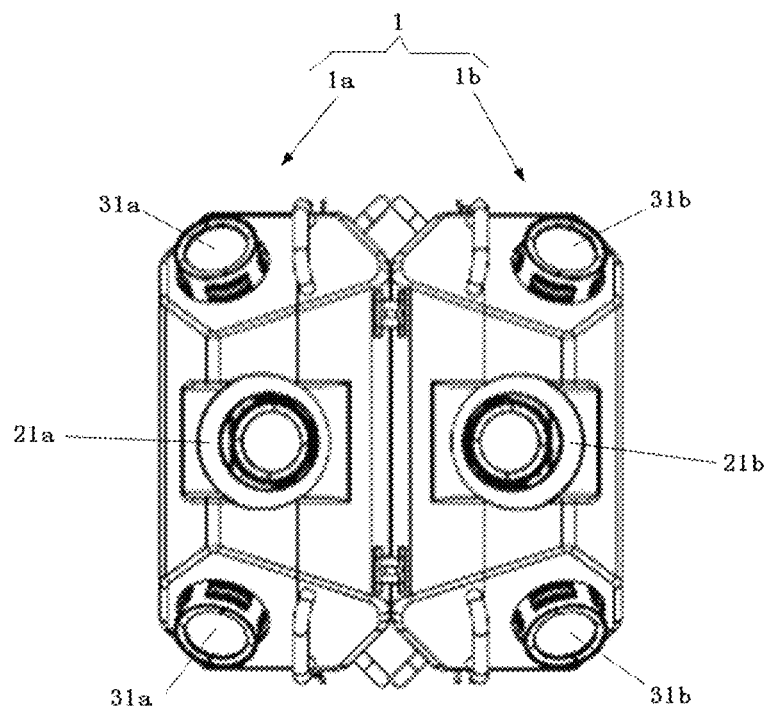
Figure 1C:
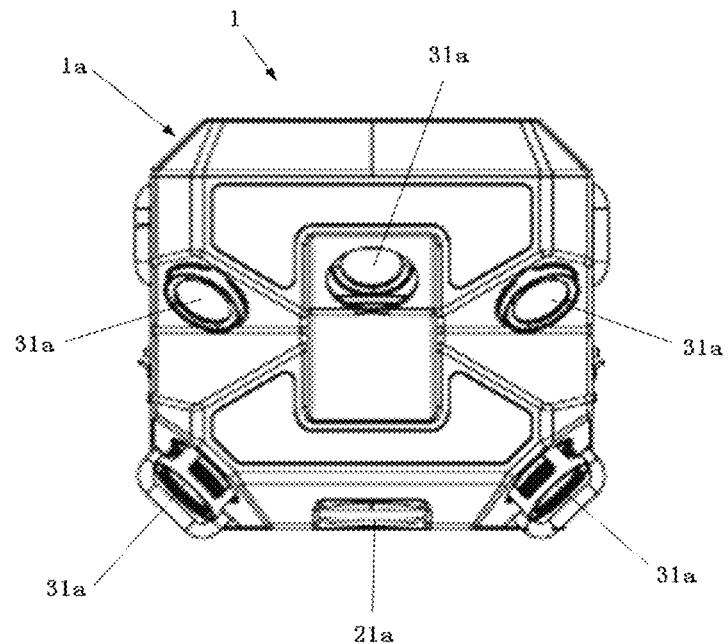

FIGS. 1a and 1b show a schematic view of an embodiment of an aerial panoramic oblique photography apparatus of the present application. In this embodiment, the aerial panoramic oblique photography apparatus may include a pod body 1 having a separable structure. The pod body 1 may include a left pod unit 1a and a right pod unit 1b. The left pod unit 1a may be provided with one nadir camera 21a and five oblique cameras 31a. The right pod unit 1b may also be provided with one nadir camera 21b and five oblique cameras 31b. That is to say, in the present embodiment, the aerial panoramic oblique photography apparatus may have a total of 12 cameras, including two nadir cameras 21a, 21b, and 10 oblique cameras 31a, 31b. The left and right pod units 1a and 1b may be fixed together to form a single unit, as depicted in FIGS. 1a to 1c. The left pod unit 1a and the right pod unit 1b may be separately provided on two sides of an aerial vehicle.

Figure 2A:
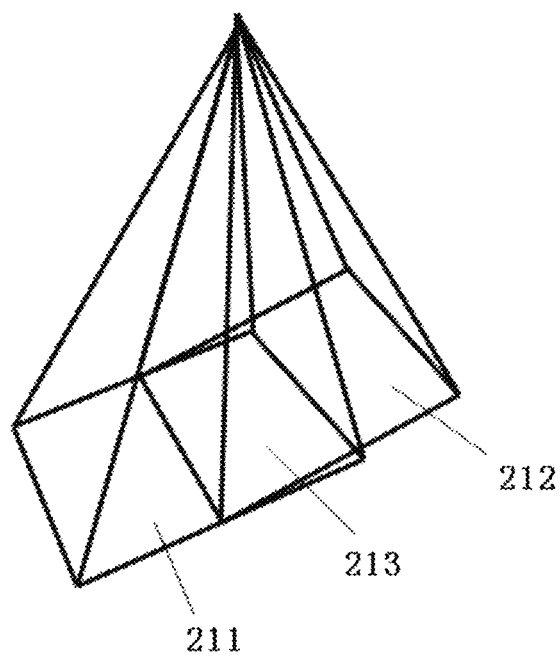
FIG. 2a is an illustrative diagram of two transversely overlapping images formed by synchronous photo-shooting by two nadir cameras.
Figure 2B:
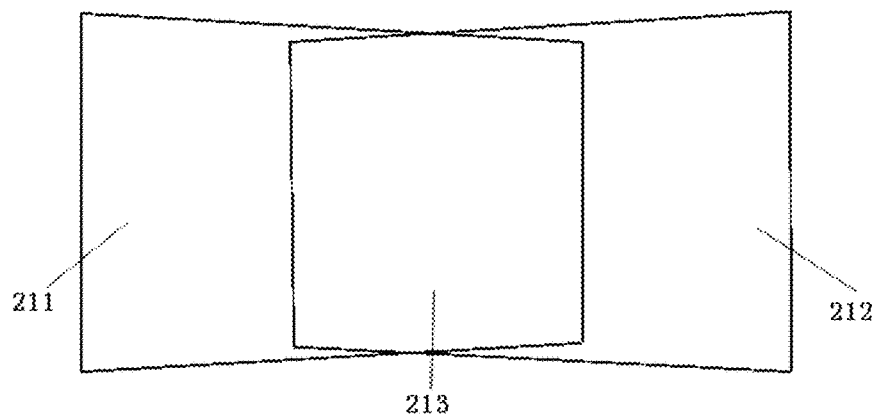
FIG. 2b is an illustrative diagram of the partially overlapping shooting regions of the two nadir cameras.
Figure 2C:
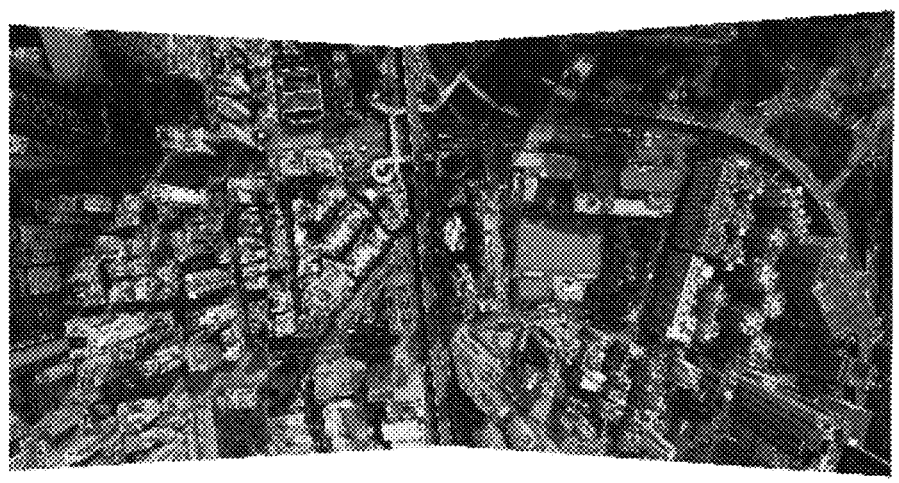
FIG. 2c is an image formed by synchronous photo-shooting of the two nadir cameras.
Figure 3A:
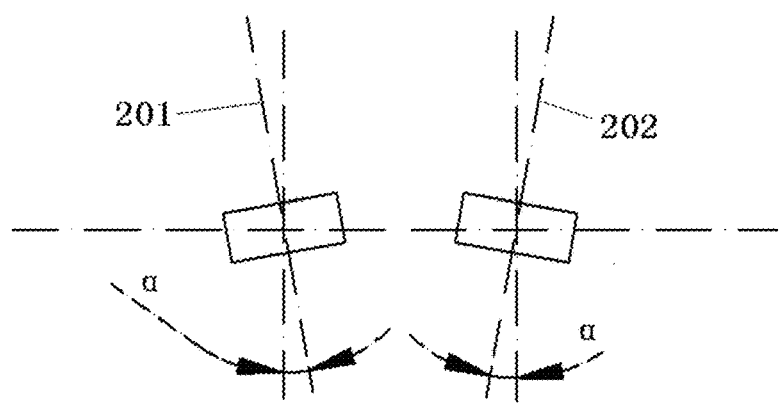
FIG. 3a is an illustrative diagram of lens axes of one way of arrangement of two nadir cameras.
Figure 3B:
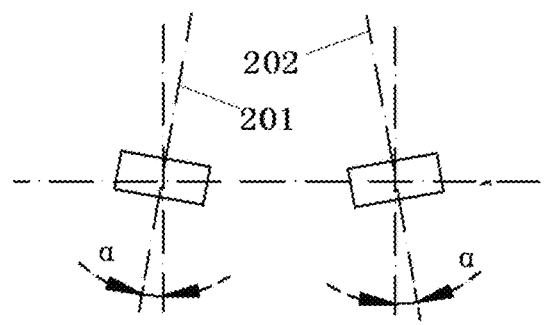
FIG. 3b is an illustrative diagram of lens axes of another way of arrangement of two nadir cameras.

As shown in FIG. 1b, the two nadir cameras 21a, 21b of the aerial panoramic oblique photography apparatus of the present application may be arranged in a transverse direction. The longitudinal direction refers to the flight direction of the aerial vehicle, and the transverse direction is the direction perpendicular to the longitudinal direction. The transverse direction and the longitudinal direction may be located on a same horizontal plane. The nadir cameras can be used for shooting photos in a downward direction. The nadir cameras can be used to produce photogrammetric surveying results, such as stereo-mapping, line drawing maps, orthophoto maps, etc. The shooting regions of the two nadir cameras 21a, 21b may be partially overlapping. As shown in FIGS. 2a to 2c, the shooting region 211 of the nadir camera 21a may partially overlap with the shooting region 212 of the nadir camera 21b. The overlapping region is designated by reference numeral 213. The lenses of the nadir cameras 21a, 21b may be fixed focus lenses or zoom lenses, preferably fixed focus lenses with a focal length of 20 to 100 mm. Referring to FIGS. 3a and 3b, the lenses of the nadir cameras 21a, 21b may have a certain inclination. That is to say, the lens axes 201, 202 of the nadir cameras 21a, 21b may be orientated at an angle α with respect to the vertical direction. The angle α is preferably smaller than 10 degrees so as to it can meet the requirement of orthophoto production by the nadir cameras 21a, 21b. The lens axes 201, 202 of the nadir cameras 21a, 21b may be inclined in converging directions towards each other, as shown in FIG. 3a; or the lens axes 201, 202 of the nadir cameras 21a, 21b may be inclined in diverging directions away from each other, as shown in FIG. 3b. In the embodiment shown in FIG. 1b, the lens axes of the nadir cameras 21a, 21b may be inclined in converging directions towards each other. The two nadir cameras 21a, 21b may be referred to as a dual camera. The lens axes of the nadir cameras 21a, 21b is preferably provided on a same plane, more preferably on a plane perpendicular to the longitudinal direction. It is preferable that the shooting regions 211 and 212 of the nadir cameras 21a and 21b have an overlap of 30% to 60%. That means the area of the overlapping area 213 is 30% to 60% of the area of the shooting regions 211 and 212 of the nadir cameras 21a and 21b.

In one embodiment, the nadir cameras 21a, 21b may employ a full-frame camera of 50 million pixels and the focal length of lens is 35 mm. The shooting regions 211, 212 of the nadir cameras 21a, 21b may have an overlap of 50%. FIG. 2c shows an image formed by synchronous photo-shooting of the two nadir cameras 21a, 21b. Using the two nadir cameras 21a, 21b, two strips of aerial images can be obtained for each aerial photo-shooting operation. This can reduce the necessary flying time and the operating cost.

As shown in FIGS. 1a to 1c, the oblique cameras 31a and 31b can be inclined by inclining devices so that they can produce photo-shooting at a certain inclination angle with respect to the vertical direction. The oblique cameras 31a, 31b can be used to capture texture of the sides of an object on the surface of a land, such as various man-made buildings and natural scenery, etc. The angle between the lens axes of the oblique cameras 31a and 31b and the vertical direction may be 30-60 degrees. In the present embodiment, ten oblique cameras 31a, 31b may be employed, i.e. five oblique cameras on the left pod unit 1a, and five oblique cameras on the right pod unit 1b. In other embodiments, the number of oblique cameras may not be limited to the above-mentioned number. It may have a plurality of oblique cameras, preferably eight or more. The oblique cameras may be provided around the nadir cameras of the photography apparatus so as to achieve panoramic oblique coverage during synchronous photo-shooting. The number of cameras for panorama coverage can be determined according to the angle of field of view of the cameras. The lenses of the oblique cameras may be fixed focus lenses or zoom lenses, preferably fixed focus lenses, and the focal length of the fixed focus lenses is preferably 35 to 150 mm. In another embodiment, the oblique cameras can be medium format cameras with fixed focus lenses having a focal length of 55 mm. The angle of the long side of the field of view may be about 51.8 degrees. During synchronous shooting, at least eight cameras may be required for panoramic coverage. In another embodiment, the oblique cameras may be fixed focus lenses with a focal length of 80 mm. The angle of the long side of the field of view may be about 36.9 degrees. During synchronous shooting, at least ten cameras may be required for panoramic coverage. The oblique cameras can also be full-frame cameras with fixed focus lenses having a focal length of 50 mm. The angle of the long side of the field of view may be about 39.2 degrees. Then during synchronous shooting, ten oblique cameras may be required for panoramic coverage.

Figure 4:
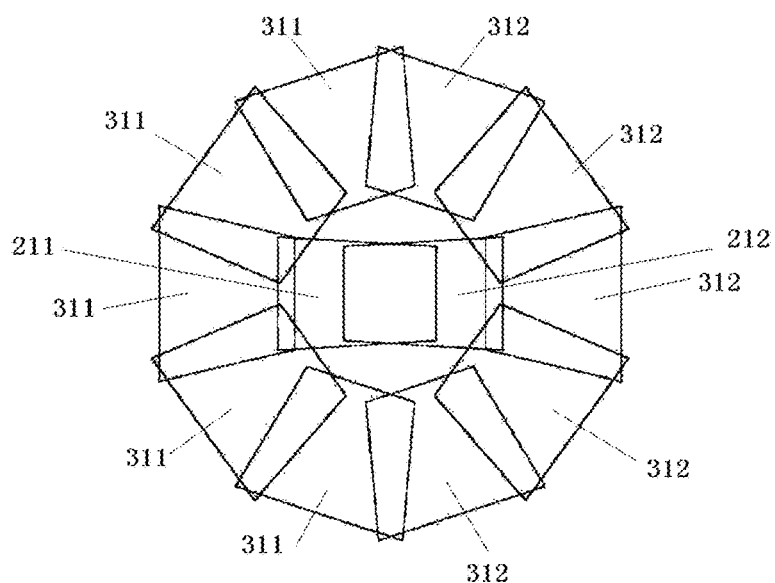
Figure 5:
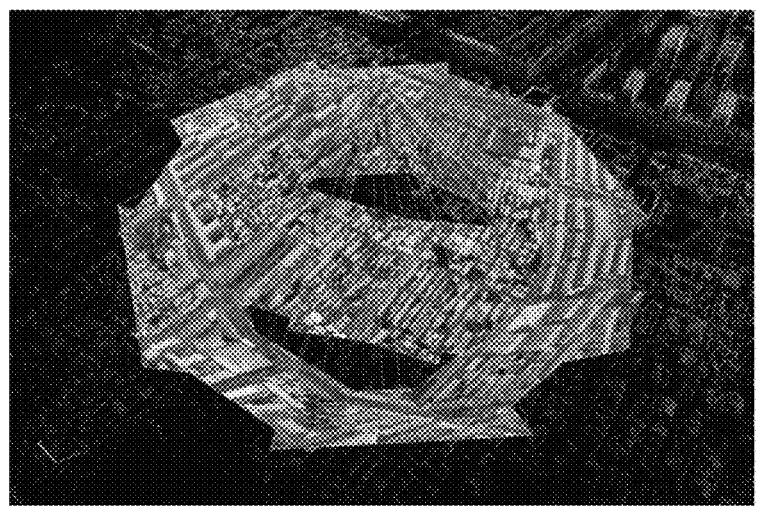

FIG. 4 is an illustrative diagram of the synchronous shooting coverage areas of the aerial panoramic oblique photography apparatus of the present embodiment. The aerial panoramic oblique photography apparatus may employ twelve full-frame cameras, including two nadir cameras 21a, 21b with 35 mm fixed focus lenses, and ten oblique cameras 31a and 31b with 50 mm fixed focus lenses. A total of twelve full-frame cameras may constitute the aerial panoramic oblique photography apparatus. Shooting regions of the nadir cameras 21a and 21b are represented by reference numeral 211, 212, and shooting regions of the oblique cameras 31a and 31b are represented by reference numeral 311, 312. FIG. 5 is an illustrative diagram of synchronous shooting by twelve cameras.

Due to the large number of cameras in the aerial panoramic oblique photography apparatus, the camera in the aerial panorama oblique photography apparatus can adopt a layered or horizontal design so as to make the design more compact. The advantage of a layered design is to minimize the transverse width of the photography apparatus. The advantage of a horizontal design is to minimize the height of the photography apparatus. In the embodiment shown in FIG. 1a, the oblique cameras 31a, 31b can be provided in two layers. The first layer may have six oblique cameras 31a, 31b and the second layer may have four oblique cameras 31a, 31b. The left pod unit 1a and the right pod unit 1b of the present embodiment can be integrated or separately mounted. For separate mounting, the entire apparatus may be divided into two units, each having a separate camera synchronization system, storage, USB 3.0 data interface, POS AV™ system, and power system, etc.

Figure 6A:
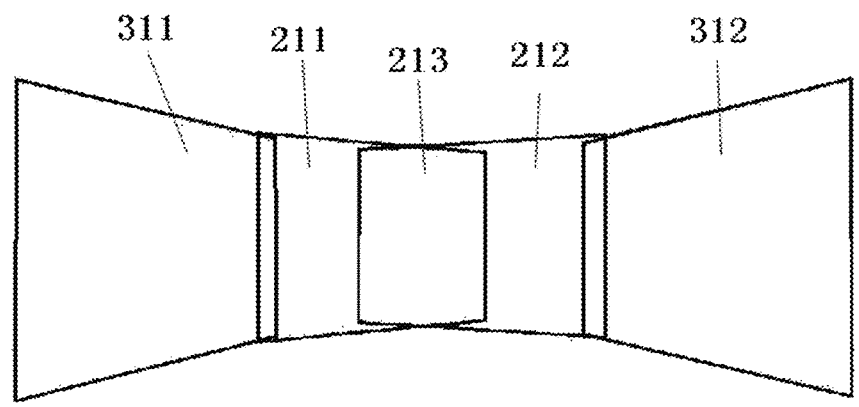
FIG. 6a is an illustrative diagram of the partially overlapping shooting regions of a nadir camera and an oblique camera adjacent to the nadir camera.
Figure 6B:
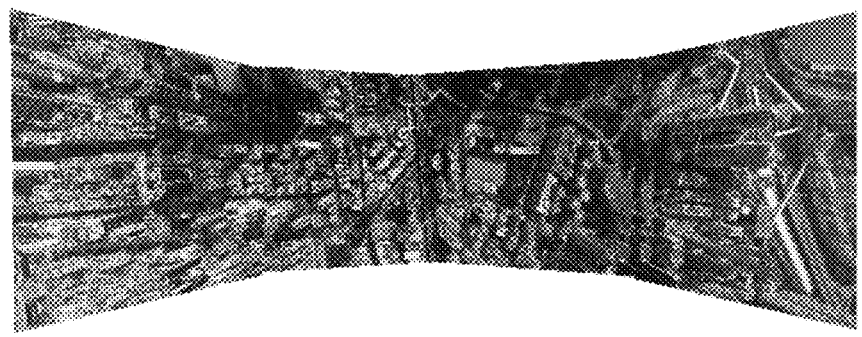
Figure 7:
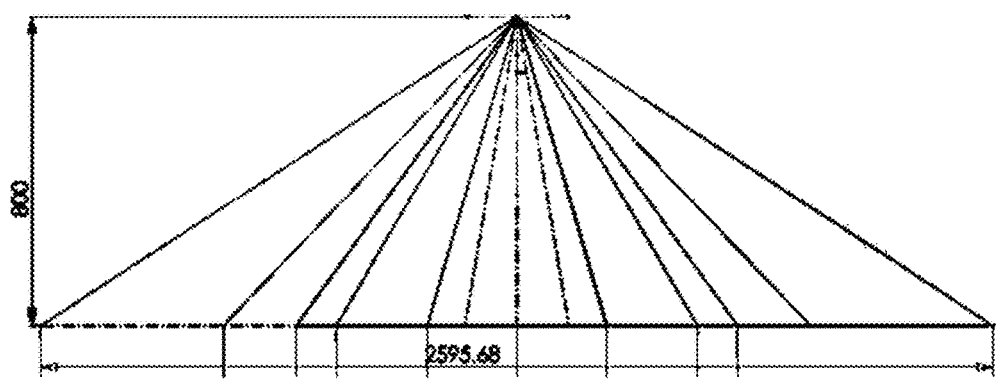
FIG. 7 is an illustrative diagram of the coverage areas of the aerial panoramic oblique photography apparatus at a flight altitude of 800 meters.

In FIGS. 6a and 6b, the shooting regions 211, 212 of the nadir cameras 21a, 21b and the transversely adjacent shooting regions 311, 312 of the oblique cameras 31a, 31b may be partially overlapped, and can form an integrated strip of images at the time of synchronous shooting. FIG. 6b is an illustrative diagram of an image formed by synchronous shooting by two nadir cameras 21a, 21b and two oblique cameras 31a, 31b transversely adjacent to the nadir cameras of the aerial panoramic oblique photography apparatus of the present embodiment. The application of strip-type shooting may include railroad, road, river, coastline, power line, oil pipeline, etc. It can adopt the aerial panoramic oblique photography apparatus of the present embodiment, and satisfy the strip-type flight requirements. As shown in FIG. 7, the width of coverage of the aerial panoramic oblique photography apparatus can be 2,595 meters when flying at a flight altitude of 800 meters.

During aerial panoramic oblique shooting, a flight management system can plan the flight path and shooting location according to the flight mission range. During execution of a mission, the flight management system can control the cameras of the aerial panoramic oblique photography apparatus to take photos according to the flight plan through connection to navigation data provided by the POS AV™ system. A camera synchronous shooting system can control synchronized shooting of the cameras when the flight management system sends out a shooting signal. Each of the nadir cameras and oblique cameras of the aerial panorama oblique photography apparatus can have an independent camera trigger device. The nadir cameras may use TTL trigger signals, and may simultaneously give exposure signals to the oblique cameras. The center exposure pulse of each camera can be returned to the dual POS AV™ system. Each POS AV™ system may need to simultaneously receive six event signals.

Each camera may have an internal storage of more than 512 GB. This can guarantee the storage for more than 10 K images. The entire system may have an internal storage of up to 120 k images. Image data can be connected to an external computer through USB3.0 Hub for downloading. Each camera may have a separate USB3.0 cable connection for the setting of camera parameters through external computer equipment. The aerial panoramic oblique photography apparatus may adopt broadband 9-36 VDC power supply which is suitable for various unmanned aerial vehicle batteries, car batteries, aircraft power sources, etc. Indicator lights may include LED navigation status indicator, nadir camera indicators, and oblique camera indicators for the POS AV™ in each set of cameras. Input/output interface of each set of cameras may include: 1 set of TNC GLASS antenna interface, power input aviation LEMO interface, 2 sets of RS232 for GLASS differential interface.

The pod body of the aerial panoramic oblique photography apparatus of the present application is not limited to the above-described separable structure, but may have an integrated one-piece structure. The nadir cameras and the oblique cameras can be provided on an integrated pod body. The pod body may also be provided with a combination of directional and positioning system (IMU/GNSS system or Applanix POS AV™ system), aircraft installation components, electronic control unit, storage unit, and flight management system.

The number of the nadir cameras of the aerial panoramic oblique photography apparatus of the present application is not limited to two, but may be two or more, i.e. at least two. The nadir cameras may be arranged in a transverse direction, and the shooting regions of adjacent nadir cameras may be partially overlapping. When three nadir cameras are used, three strips of aerial photos can be produced for each flight of photo-taking. When the number of nadir cameras is more than two, the shooting regions of adjacent nadir cameras of the nadir cameras may have an overlapping of 30% to 60%.

The aerial panoramic oblique photography apparatus of the present application may have at least two nadir cameras arranged in a transverse direction. A plurality of strips of nadir route images can be obtained when each aerial oblique photo-taking is performed. This can improve shooting efficiency, reduce the number of flight and lower the shooting cost. The combination of at least two nadir cameras and a plurality of oblique cameras can obtain texture of the sides of an urban building from multiple angles, and can more effectively and completely establish urban three-dimensional real scenery model.

Specific embodiments have been described above with reference to the accompanying drawings. However, the present application is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. An aerial panoramic oblique photography apparatus comprising
   a pod body comprising a left pod unit and a right pod unit;
   at least two nadir cameras arranged in a transverse direction perpendicular to a bisecting plane between the left pod unit and the right pod unit, wherein at least one nadir camera is provided on the left pod unit and at least one nadir camera is provided on the right pod unit; and
   a plurality of oblique cameras disposed on the left pod unit and the right pod unit at an upper level and a lower level;
   wherein an angle of a lens axis of each nadir camera from a vertical direction is greater than 0 degree and less than 10 degrees, and an angle of a lens axis of each oblique camera from the vertical direction is 30 to 60 degrees, the vertical direction is a nadir direction from the lens of each nadir or oblique camera and perpendicular to a separation plane between the upper level and the lower level, the vertical direction, the transverse direction and a direction of an intersection line of the bisecting plane and the separation plane are perpendicular to each other; and wherein shooting regions of adjacent nadir cameras of the at least two nadir cameras are partially overlapping.

2. The aerial panoramic oblique photography apparatus as claimed in claim 1, wherein 30% to 60% of the shooting regions of the adjacent nadir cameras of the at least two nadir cameras are overlapping.

3. The aerial panoramic oblique photography apparatus as claimed in claim 1, wherein the shooting regions of the nadir cameras and shooting regions of the oblique cameras transversely adjacent to the nadir cameras are partially overlapping.

4. The aerial panoramic oblique photography apparatus as claimed in claim 1, wherein the lens axes of the at least two nadir cameras are lying on a same plane.

5. The aerial panoramic oblique photography apparatus as claimed in claim 1, wherein the lens axes of the adjacent nadir cameras are inclined in converging directions towards each other.

6. The aerial panoramic oblique photography apparatus as claimed in claim 1, wherein the lens axes of the adjacent nadir cameras are inclined in diverging directions away from each other.

7. The aerial panoramic oblique photography apparatus as claimed in claim 1, wherein a lens of the nadir camera is a fixed focus lens, and focal length of the fixed focus lens of the nadir camera is 20 to 100 mm.

8. The aerial panoramic oblique photography apparatus as claimed in claim 1, wherein a lens of the oblique camera is a fixed focus lens, and focal length of the fixed focus lens of the oblique camera is 35 to 150 mm.

9. The aerial panoramic oblique photography apparatus as claimed in claim 8, wherein the focal length of the fixed focus lens of the oblique camera is 55 mm and an angle of a long side of a field of view of the oblique camera is about 51.8 degrees.

10. The aerial panoramic oblique photography apparatus as claimed in claim 8, wherein the focal length of the fixed focus lens of the oblique camera is 80 mm and an angle of a long side of a field of view of the oblique camera is about 36.9 degrees.

11. The aerial panoramic oblique photography apparatus as claimed in claim 8, wherein the focal length of the fixed focus lens of the oblique camera is 50 mm and an angle of a long side of a field of view of the oblique camera is about 39.2 degrees.

12. The aerial panoramic oblique photography apparatus as claimed in claim 1, wherein the number of the oblique cameras is eight or more.

13. The aerial panoramic oblique photography apparatus as claimed in claim 1, wherein the pod body is a separable structure.

14. The aerial panoramic oblique photography apparatus as claimed in claim 1, wherein the plurality of oblique cameras are disposed around the at least two nadir cameras.

* * * * *